(12) United States Patent
Wilton et al.

(10) Patent No.: US 8,049,384 B2
(45) Date of Patent: Nov. 1, 2011

(54) ELECTRONIC DRIVE UNIT

(75) Inventors: Daryl A. Wilton, Macomb, MI (US);
Edward W. Mellet, Rochester Hills, MI (US); James M. Hart, Belleville, MI (US); Clinton E. Carey, Highland, MI (US); Joseph Young-Long Chen, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 12/487,934

(22) Filed: Jun. 19, 2009

(65) Prior Publication Data

US 2010/0320849 A1    Dec. 23, 2010

(51) Int. Cl.
*H02K 7/116* (2006.01)
*F16H 1/06* (2006.01)
(52) U.S. Cl. .................. 310/75 R; 310/83; 475/149
(58) Field of Classification Search ........... 310/75 R, 310/83, 96, 98, 99; 74/6, 7 C, 7 E, 7 R, 421 A; 180/248–249; 475/280, 284, 285, 295, 149, 150

See application file for complete search history.

(56) References Cited

U.S. PATENT DOCUMENTS 7,884,511 B2 *   2/2011   Mogi et al. ............... 310/54

* cited by examiner

*Primary Examiner* — Tran Nguyen
(74) *Attorney, Agent, or Firm* — Quinn Law Group, PLLC

(57) ABSTRACT

An electronic drive unit includes a case housing that extends along a primary axis. A sleeve shaft and an electric motor are disposed in the hollow interior of the case housing. The electric motor is operatively connected to the sleeve shaft to rotate the sleeve shaft about the primary axis. At least one gear set is disposed in operative engagement with the sleeve shaft and is configured for rotation about the primary axis. A pair of output shafts each extends along the primary axis within the case housing. The output shafts are rotatably connected to the gear set and are configured for rotation about the primary axis. The gear set is configured to translate rotation of the sleeve shaft into rotation of the output shafts about the primary axis at a rotational velocity that is less than the rotational velocity of the sleeve shaft.

18 Claims, 10 Drawing Sheets

ELECTRONIC DRIVE UNIT

TECHNICAL FIELD

The present invention relates to an electronic drive unit configured for propelling at least one wheel of a vehicle.

BACKGROUND OF THE INVENTION

A powertrain of a typical four-wheel-drive vehicle includes an engine, a transmission, a transfer case, front and rear driveshafts, and front and rear differentials. The transfer case is operatively connected to the transmission to direct power to front and/or rear wheels. The front driveshaft operatively connects the transfer case to the front differential and the rear driveshaft operatively connects the transfer case to the rear differential. The front differential drives the front wheels and the rear differential drives the rear wheels. During certain driving conditions, the transfer case is operated to direct power to only the rear wheels. In other driving conditions, i.e., in four-wheel-drive, the transfer case is operated to direct power to both the front and rear wheels.

SUMMARY OF THE INVENTION

An electronic drive unit (EDU) includes a case housing that defines a hollow interior and extends along a primary axis. A sleeve shaft is disposed within the hollow interior of the case housing and extends along the primary axis. An electric motor is disposed in the hollow interior of the case housing and radially surrounds a portion of the sleeve shaft. The electric motor is operatively connected to the sleeve shaft such that the sleeve shaft rotates about the primary axis in response to operation of the electric motor. At least one gear set is disposed in spaced relationship to the electric motor, along the primary axis. The gear set is in operative engagement with the sleeve shaft and is configured for rotation about the primary axis. At least one output shaft is at least partially disposed within the hollow interior of the case housing and extends along the primary axis. The output shaft is rotatably connected to the gear set and is configured for rotation about the primary axis. The gear set is configured to translate rotation of the sleeve shaft into rotation of the at least one output shaft about the primary axis at a rotational velocity that is less than the rotational velocity of the sleeve shaft.

In another embodiment, an EDU includes a case housing and an electric motor. The case housing defines a hollow interior. The electric motor includes a stator and a rotor. The stator is radially disposed about a primary axis within the hollow interior of the case housing. The rotor is radially surrounded by the stator within the hollow interior of the case housing and configured for rotation about the primary axis, relative to the stator. A motor housing extends about the primary axis and surrounds the stator about the primary axis. A cooling cavity is defined between the motor housing and the case housing and is configured such that a coolant flows through the cooling cavity to cool the electric motor. At least one seal is disposed between the case housing and the motor housing. The case housing defines at least one vent that opens to the at least one seal. The vent is configured to allow any of the coolant that leaks past the at least one seal to flow therethrough and out of the case housing.

In yet another embodiment, an EDU includes a case housing that defines a hollow interior extending along a primary axis. A sleeve shaft is disposed within the hollow interior of the case housing and extends along the primary axis. An electric motor is disposed in the hollow interior of the case housing and radially surrounds a portion of the sleeve shaft. The electric motor is operatively connected to the sleeve shaft such that the sleeve shaft rotates about the primary axis in response to operation of the electric motor. At least one gear set is in operative engagement with the sleeve shaft and is configured for rotation about the primary axis. The gear set includes a pinion carrier. A first output shaft and a second output shaft each extend along the primary axis in opposing directions. A differential assembly is rotatably disposed about the primary axis between the first output shaft and the second output shaft. The differential assembly is rotatably engaged with the pinion carrier of the at least one gear set such that the differential assembly rotatably interconnects each of the at least one gear set and the output shafts. The gear set is configured to rotate the first output shaft and the second output shaft about the primary axis at a rotational velocity that is less than the rotational velocity of the sleeve shaft.

Therefore, the transfer case, the front or the rear differential, and the front or rear driveshafts may be replaced with the EDU. Replacing these components with the EDU saves cost, weight, and complexity. Additionally, differentiation of a rotational speed and/or torque between each of the rear wheels may be achieved by the EDU without the use of these components. Elimination of these components can improve fuel economy through weight reduction and by reducing a drag that is associated with rotating these components to propel the vehicle. Also, the EDU may be used for regenerative braking.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
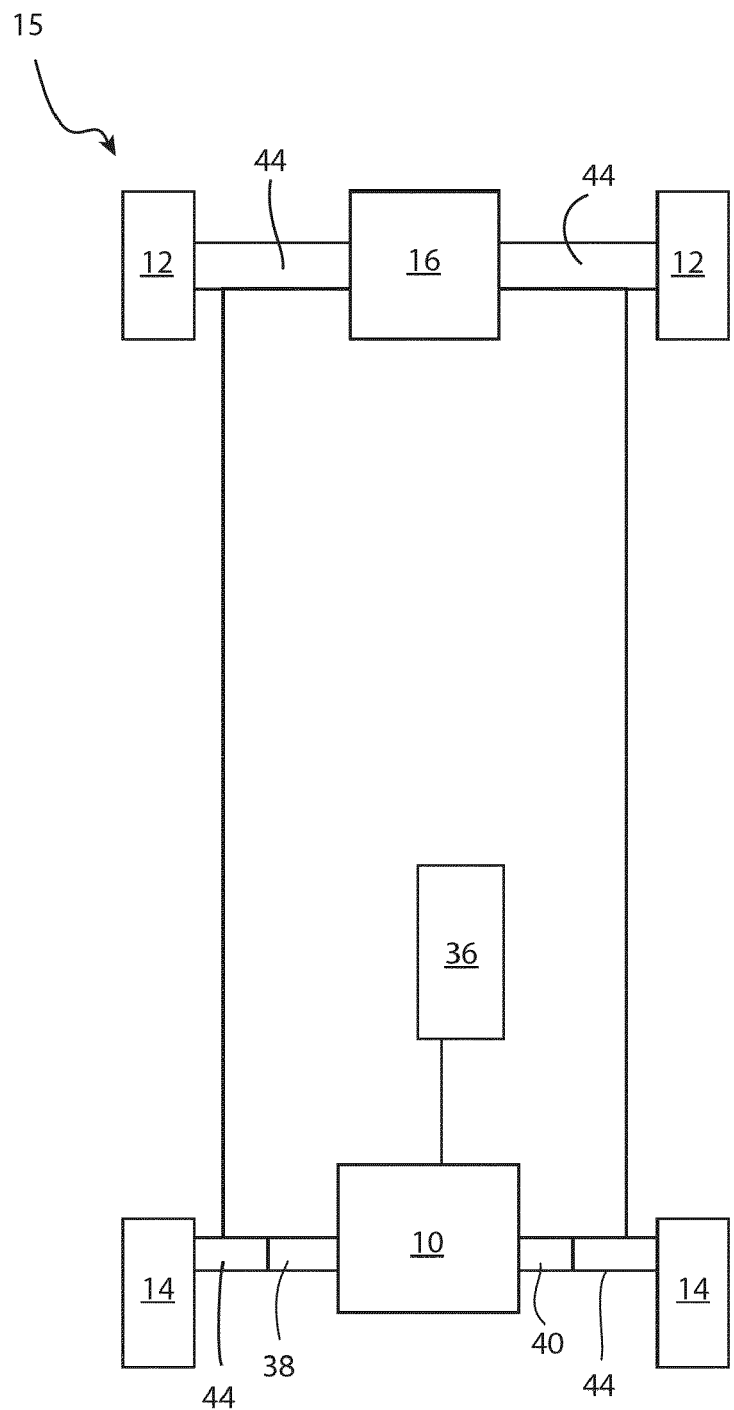
FIG. 1 is a schematic plan view of a vehicle having an engine interconnecting a pair of front wheels and an electric drive unit (EDU) interconnecting a pair of rear wheels.
Figure 2:
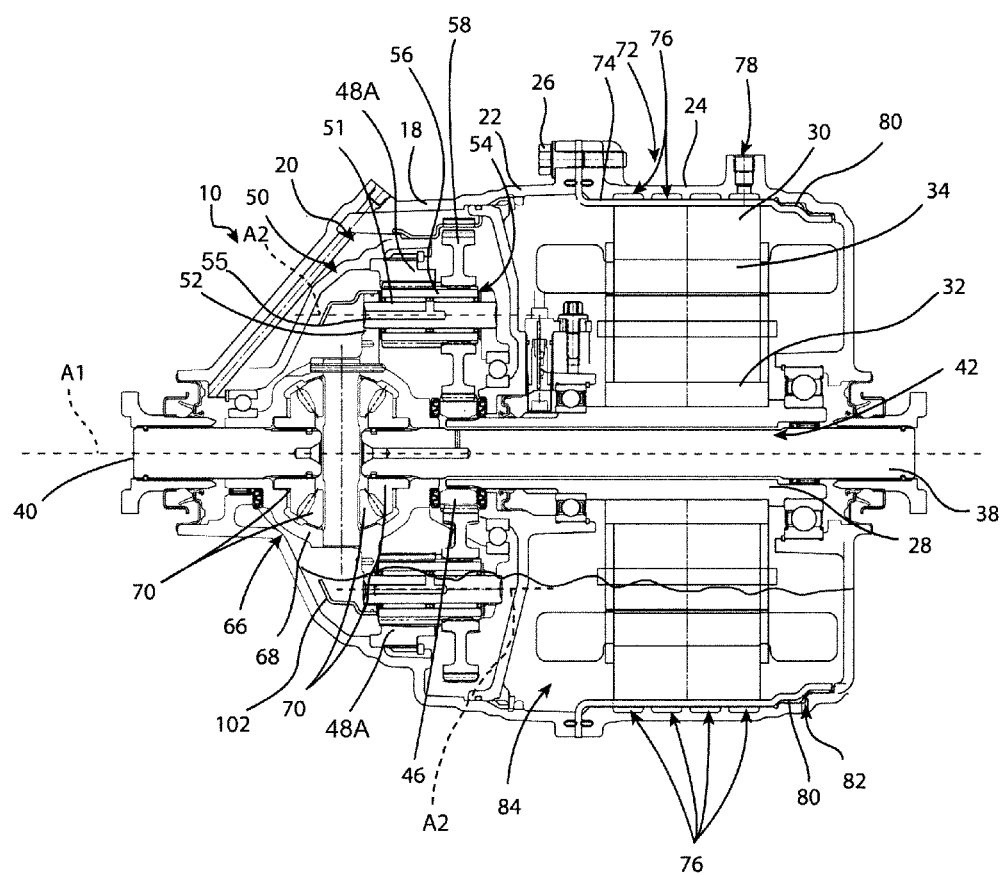
FIG. 2 is schematic cross sectional side view of one embodiment of the EDU of FIG. 1.

Referring to the drawings, wherein like reference numbers refer to like components, FIG. 1 shows an electronic drive unit 10 (EDU). The EDU 10 may be used in conjunction with an engine 16 of a vehicle 15 such that the engine 16 propels front wheels 12 of the vehicle 15 and the EDU 10 propels the rear wheels 14 of the vehicle 15. However, it should be appreciated that other configurations of the EDU 10 within the vehicle 15 may be used as known to those skilled in the art.

Referring to FIGS. 2-9, the EDU 10 includes a case housing 18 defining a hollow interior 20 extending along a primary axis A1. The case housing 18 may include a case 22 and a case cover 24. The case cover 24 is removably attached to the case 22 via fasteners 26 and the like. However, it should be appreciated that other configurations of the case housing 18 may also be used as known to those skilled in the art.

A sleeve shaft 28 is disposed within the hollow interior 20 of the case housing 18 and extends along the primary axis A1. An electric motor 30 is disposed in the hollow interior 20 of the case housing 18 and radially surrounds a portion of the sleeve shaft 28. More specifically, the electric motor 30 may be disposed in the case cover 24 of the case housing 18. However, it should be appreciated that the electric motor 30 is not limited to being housed within the case cover 24 of the case housing 18. The electric motor 30 is operatively connected to the sleeve shaft 28 such that the sleeve shaft 28 rotates about the primary axis A1 in response to operation of the electric motor 30. More specifically, the electric motor 30 includes a rotor 32 and a stator 34 that radially surrounds the rotor 32 about the primary axis A1. The rotor 32 surrounds a portion of the sleeve shaft 28 about the primary axis A1. The rotor 32 and the portion of the sleeve shaft 28 are rotatably engaged with one another, i.e., via a splined engagement and the like. The stator 34 is grounded to the case housing 18. As the rotor 32 rotates about the primary axis A1, relative to the stator 34, the rotor 32 causes the sleeve shaft 28 to rotate about the primary axis A1.

Referring again to FIG. 1, the EDU 10 may be operatively connected to a controller 36 within the vehicle 15. The controller 36 controls operation of the electric motor 30 within the EDU 10 in order to selectively rotate the sleeve shaft 28, i.e., via rotation of the rotor 32, about the primary axis A1 and propel one or more of the rear wheels 14 of the vehicle 15.

Referring to FIGS. 2-9, at least one output shaft 38, 40 is at least partially disposed within the hollow interior 20 of the case housing 18 and extends along the primary axis A1. Each of the output shafts 38, 40 are configured to rotate about the primary axis A1. The output shaft 38, 40 may be a first output shaft 38 and a second output shaft 40 that each extend along the primary axis A1 in opposing directions. Each output shaft 38, 40 is at least partially disposed within the hollow interior 20 of the case housing 18. Referring to FIG. 1, the output shafts 38, 40 are configured for connection to an axle 44 that is, in turn operatively connected to a respective rear wheel 14. Referring again to FIGS. 2-9, the sleeve shaft 28 defines a passage 42 extending therethrough, along the primary axis A1. The first output shaft 38 extends through the passage 42 such that the sleeve shaft 28 surrounds the first output shaft 38.

Referring to the embodiments shown in FIGS. 2-5, a first gear set 50 is disposed in axially spaced relationship along the primary axis A1 to the electric motor 30. The first gear set 50 is a stepped-pinion planetary gear set, which is described in more detail below. The first gear set 50 includes a sun gear 46, a ring gear 48A, and a first planetary carrier assembly 55.

Each planetary carrier assembly 55 includes a first pinion carrier 52, a plurality of pinions 54, and a plurality of bearings (not shown).

The sun gear 46 rotatably surrounds the sleeve shaft 28. The sun gear 46 is rotatably engaged with the sleeve shaft 28, e.g., via a splined engagement and the like, such that rotation of the sleeve shaft 28 about the primary axis A1 causes the sun gear 46 to also rotate about the primary axis A1 in unison with the sleeve shaft 28. The sun gear 46 is axially spaced along the primary axis A1 from the electric motor 30. The ring gear 48A is disposed in the hollow interior 20 of the case housing 18 and is secured to the case housing 18. The ring gear 48A is splined to the case housing 18 and radially surrounds the primary axis A1.

The first planetary carrier assembly 55 is disposed in axially spaced relationship along the primary axis A1 to the electric motor 30. The first planetary carrier assembly 55 radially surrounds the primary axis A1 and the sun gear 46. The first planetary carrier assembly 55 is in meshing engagement with the sun gear 46 and the ring gear 48A. As a result of the meshing engagement between the planetary carrier assembly 55 and the ring gear 48A and the sun gear 46, the pinions 54 are configured to rotate about a respective secondary axis A2, relative to the ring gear 48A and the sun gear 46, causing the first planetary carrier assembly 55 to rotate about the primary axis A1.

The first gear set 50 may be only one planetary gear set 50, as shown in FIGS. 2-5. However, it should be appreciated that any number of gear sets 50 may be disposed in spaced relationship to one another along the primary axis A1, such as a first and a second gear set 50, 60, as shown in the embodiments of FIGS. 6-9. In these embodiments, each gear set 50, 60 includes a respective first and second planetary carrier assembly 55, 65. The gear sets 50, 60 in FIGS. 6-9 are operatively attached to one or more of the output shafts 38, 40 such that each gear set 50, 60 is configured to translate rotation of the sleeve shaft 28 about the primary axis A1 into rotation of each of the output shafts 38, 40 about the primary axis A1 at a rotational velocity that is less than the rotational velocity of the sleeve shaft 28, i.e., to provide gear reduction.

Referring to FIGS. 2-9, each planetary carrier assembly 55, 65 includes a plurality of pinion shafts 51 that extend along a corresponding secondary axis A2. The secondary axes A2 are in radially spaced and parallel relationship to the primary axis A1. As will be explained in more detail below, the planetary carrier assemblies 55, 65 of FIGS. 6-9 also include tertiary axes A3 that are in radially spaced and parallel relationship to the primary axis A1. Each planetary carrier assembly 55, 65 includes a respective first and second pinion carrier 52, 62 that radially surround, and are configured for rotation about, the primary axis A1. A pinion 54 radially surrounds the respective pinion shaft 51 about the secondary axis A2 such that each of the pinions 54 are rotatable about to the respective pinion shaft 51 as the respective planetary carrier assembly 55, 65 rotates about the primary axis A1, relative to the sun gear 46 and the ring gear 48A.

Referring again to the embodiments shown in FIGS. 2-5, the pinion 54 may be a stepped-pinion that includes an inner pinion 56 and an outer pinion 58. The outer pinion 58 radially surrounds the inner pinion 56 about the secondary axis A2 such that the outer pinion 58 extends radially away from the inner pinion 56 to provide a pinion 54 that is "stepped". However, it should be appreciated that in order to provide a pinion 54 that is stepped, this configuration of the inner and outer pinions 58 is not required as other configurations known to those skilled in the art may also be used. The inner pinion 56 and the outer pinion 58 each extend radially away from the secondary axis A2. The outer pinion 58 is in meshing engagement with the sun gear 46. Likewise, the inner pinion 56 is in meshing engagement with the ring gear 48A. The inner and outer pinions 58 rotate in unison about the pinion shaft 51 and the secondary axis A2, relative to the sun gear 46 and the ring gear 48A, in response to rotation of the sun gear 46 about the primary axis A1. This means that as the inner pinion 56 rotates about the secondary axis A2 and meshes with the ring gear 48A, the entire planetary carrier assembly 55 rotates about the primary axis A1, relative to the sun gear 46 and the ring gear 48A.

The alternative embodiments, shown in FIGS. 6-9, include the first gear set 50 and the second gear set 60. In this embodiment, the second gear set 60 is axially spaced along the primary axis A1 from the first gear set 50. In this embodiment, the sun gear 46 that surrounds the sleeve shaft 28 is a first sun gear 46. The second gear set 60 includes the second sun gear 64, a respective ring gear 48B, and the second planetary carrier assembly 65. The second planetary carrier assembly 65 includes the second pinion carrier 62, a plurality of pinions 54, and bearings (not shown). A second sun gear 64 of the second gear set 60 extends from the first pinion carrier 52 of the first gear set 50. This means that the second sun gear 64 rotates in unison with first pinion carrier 52 about the primary axis A1. Therefore, rotation of the first pinion carrier 52 about the first axis A1 drives the second planetary carrier assembly 65. The second planetary carrier assembly 65 radially surrounds the primary axis A1, in axially spaced relationship to the first gear set 50. As mentioned above, the first pinion carrier 52 of the first planetary carrier assembly 55 is rotatably engaged with the second sun gear 64 of the second gear set 60. Likewise, the second pinion carrier 62 of the second planetary carrier assembly 65 of the second gear set 60 is rotatably operatively connected to at least one of the output shafts 38, 40.

The pinions 54 of each planetary carrier assembly 55, 65 in FIGS. 6-9 are in meshing engagement with the respective ring gear 48A, 48B and sun gear 46, 64. The pinions 54 of the first planetary carrier assembly 50 are rotatable about the respective secondary axis A2, relative to the first sun gear 46 and the respective ring gear 48A. Therefore, as the sleeve shaft 28 and the first sun gear 46 rotate in unison about the primary axis A1, in response to rotation of the rotor 32, the pinions 54 of the first planetary carrier assembly 50 rotate about the respective secondary axis A2, relative to the first sun gear 46, via the meshing engagement between the pinions 54 of the first planetary carrier assembly 55 and the first sun gear 46. Likewise, by virtue of the mesh between the pinions 54 of the first planetary carrier assembly 55 and the respective sun gear 46 and ring gear 48A, the first planetary carrier assembly 55 rotates about the primary axis A1, relative to the respective sun gear 46 and ring gear 48B. As discussed above, the first planetary carrier assembly 55 is interconnected with the second sun gear 64 such that as the first pinion carrier 52 of the first planetary carrier assembly 55 rotates about the primary axis A1, the second sun gear 64 also rotates about the primary axis A1. As the second sun gear 64 rotates about the primary axis A1 with the first planetary carrier assembly 55, the pinions 54 of the second planetary carrier assembly 65 rotate about the respective tertiary axis A3, relative to the second sun gear 64 and the respective ring gear 48B, via a meshing engagement between the pinion 54 of the second planetary carrier assembly 65 and the second sun gear 64. The tertiary axes A3 each extend in radially spaced and parallel relationship to the primary axis A1. Therefore, as the second planetary carrier assembly 65 rotates about the primary axis A1, the second pinion carrier 62 also rotates about the primary axis A1, causing at least one of the output shafts 38, 40 to also rotate about the primary axis A1. The pinions 54 of each planetary carrier assembly 55, 65, the ring gears 48A, 48B, and the sun gears 46, 64 are sized and configured to provide a desired gear reduction such that the rotational velocity of the output shafts 38, 40 is less than the rotational velocity of the sleeve shaft 28.

Referring to FIGS. 2-9, a differential assembly 66 is rotatably disposed about the primary axis A1 between the first output shaft 38 and the second output shaft 40. The differential assembly 66 operatively interconnects the first sun gear 46 or the second sun gear 64 of the respective gear set 50, 60 and each of the output shafts 38, 40. Therefore, the differential assembly 66 and each of the output shafts 38, 40 rotate in unison about the primary axis A1 in response to the sleeve shaft 28 rotating about the primary axis A1. The differential assembly 66 includes a gear housing 68. Referring to FIGS. 2-5, the first pinion carrier 52 extends from the gear housing 68. Referring to FIGS. 6-9, the second pinion carrier 62 extends from the gear housing 68. The gear housing 68 rotatably supports each of the output shafts 38, 40 along the primary axis A1. A plurality of differential gears 70 are disposed within the gear housing 68 in meshing relationship with each of the output shafts 38, 40. The differential gears 70 are of the type known to those skilled in the art such that the first output shaft 38 is allowed to rotate relative to the second output shaft 40 in the presence of a torque differential between the output shafts 38, 40. Referring to FIGS. 1-3 and 4-9, two differential gears 70, which are located on the primary axis A1, are splined to the two output shafts 38, 40 to drive the output shafts 38, 40. Although four differential gears 70 are shown in the Figures, there could actually be six differential gears 70, i.e., two differential gears on an axis (not shown) which is perpendicular to the primary axis A1.

Operation of the electric motor 30 within the case housing 18 may generate heat. Referring to FIGS. 2-9, in order to dissipate the heat from the electric motor 30, a cooling jacket 72 may be provided to surround the electric motor 30. The cooling jacket 72 includes a motor housing 74 that is disposed between the electric motor 30 and the case cover 24. The motor housing 74 extends about the primary axis A1 and surrounds the electric motor 30. A cooling cavity 76 is defined between the motor housing 74 and the case cover 24 of the case housing 18 and is configured such that a coolant flows through the cooling cavity 76 to dissipate the heat and cool the motor housing 74. The coolant may be water. However, it should be appreciated that the coolant may also be any other fluid known to those skilled in the art for dissipating heat. The cooling cavity 76 may wrap around an exterior of the motor housing 74. In the embodiments show, the cooling cavity 76 is helical in shape. However, it should be appreciated that the shape of the cooling cavity 76 may be any desired shape suitable for dissipating heat from the electric motor 30. The case housing 18 may also include a port 78 that opens to the cooling cavity 76. More preferably, at least two ports 78 open to the cooling cavity 76. Each port 78 is in fluid communication with the cooling cavity 76 such that the ports 78 may supply and/or remove the coolant from the cooling cavity 76. At least one seal 80 may be disposed between the motor housing 74 and the case housing 18. The seal 80 is configured to prevent leakage of the coolant from the cooling cavity 76 to the electric motor 30. To further prevent leakage of the coolant to the electric motor 30, the case 22 may also define at least one vent 82 that opens to the seal 80. The vent 82 is configured to allow any of the coolant that leaks past the seal 80 to flow therethrough and out the case housing 18, i.e., away from the electric motor 30.

Figure 3:
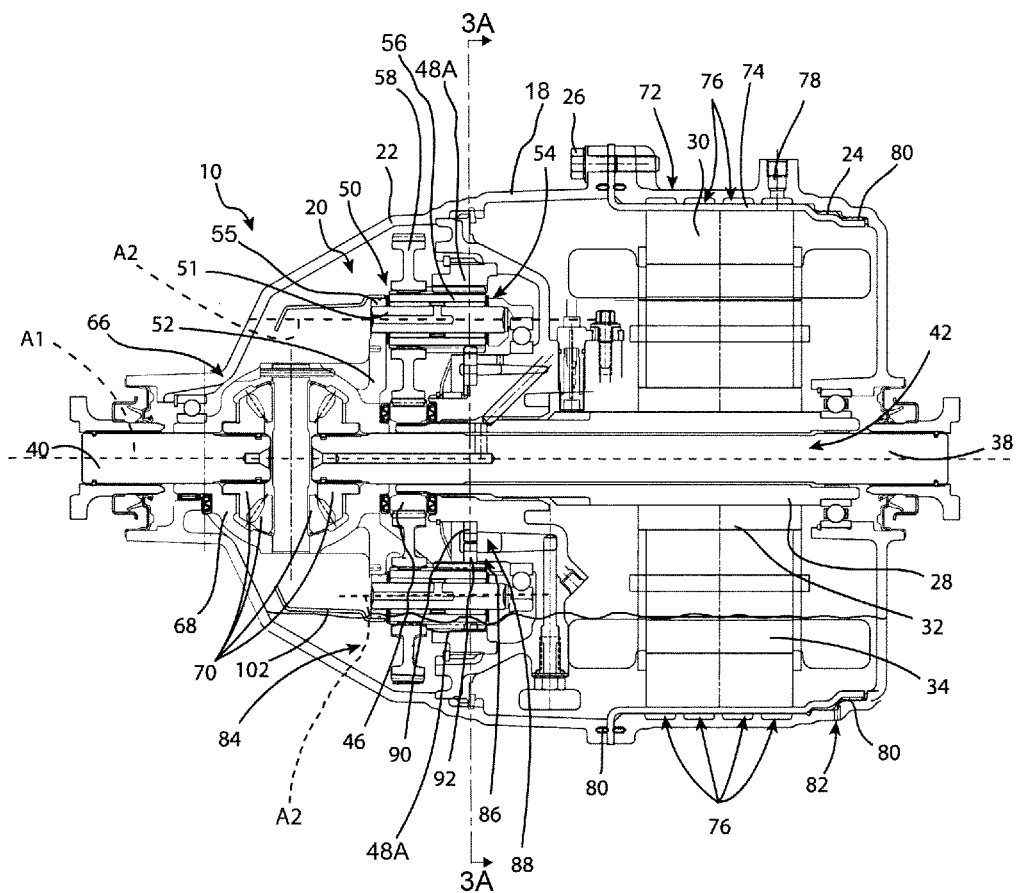
FIG. 3 is a schematic cross sectional side view of another embodiment of the EDU of FIG. 1 having a sun pump for providing lubrication.
Figure 3A:
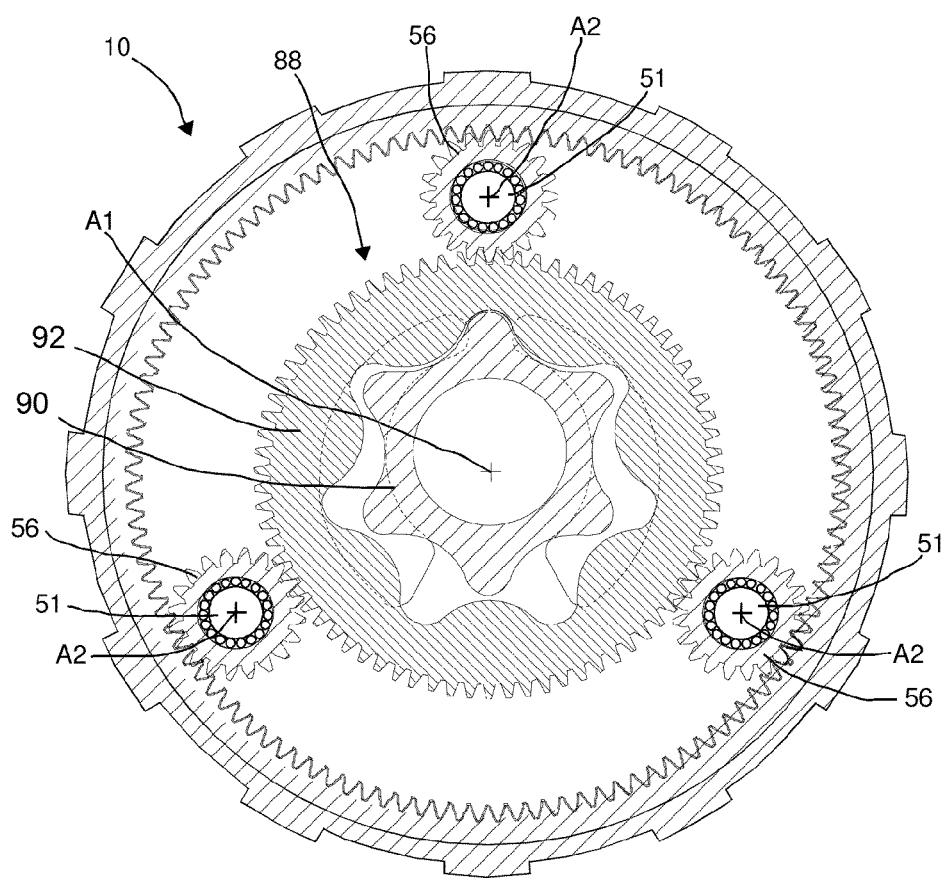
FIG. 3A is a cross sectional side view taken along line 3A-3A of FIG. 3 showing the sun pump for providing lubrication.
Figure 4:
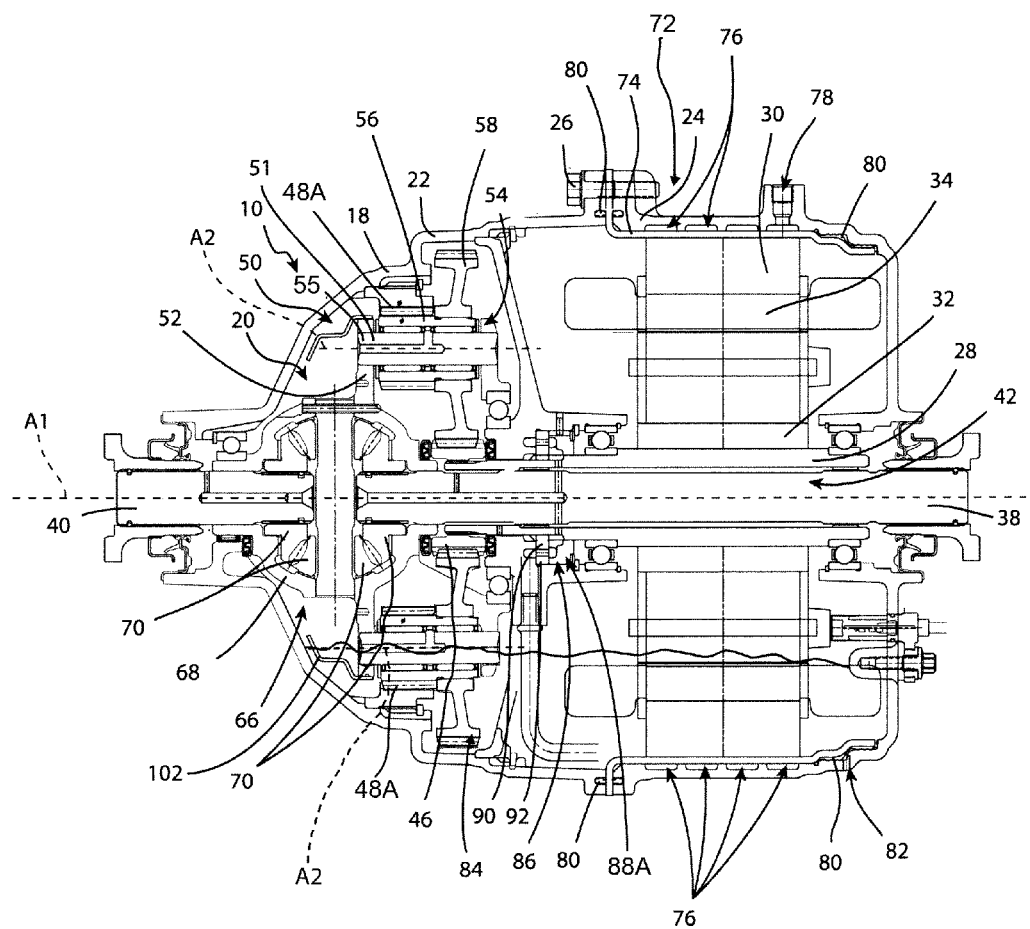
FIG. 4 is a schematic cross sectional side view of another embodiment of the EDU of FIG. 1 having an input-driven pump for providing lubrication.
Figure 7:
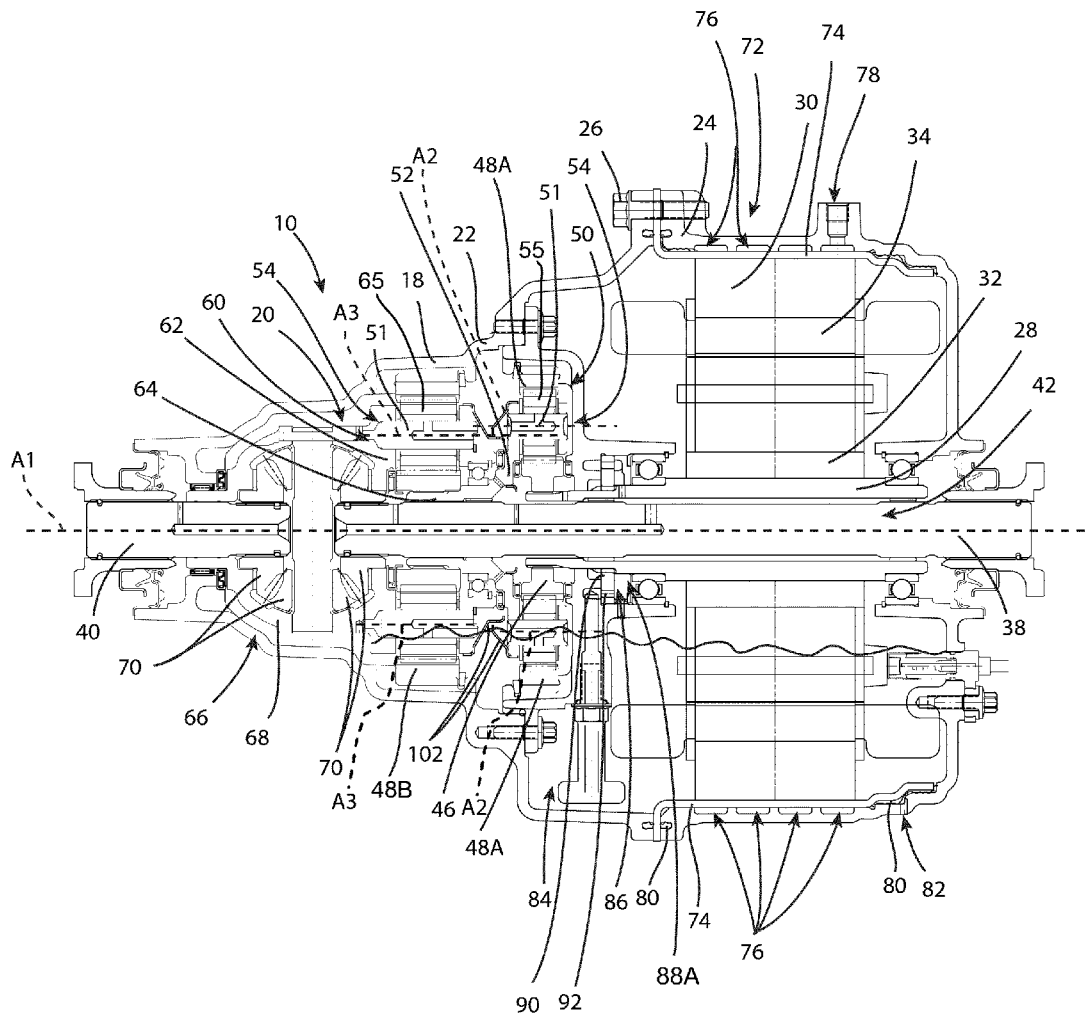
FIG. 7 is a schematic cross sectional side view of another embodiment of the EDU of FIG. 1 having an input-driven pump for providing lubrication.

Referring to FIGS. 3-5 and 7-9, in order to provide lubrication to the gear set(s) 50, 60, the differential assembly 66, the output shafts 38, 40, the sleeve shaft 28, etc., the EDU 10 may include a sump 84 and at least one pump 86. The sump 84 is disposed in the case housing 18 and is configured to hold a volume of a fluid. The fluid may be oil. However, it should be appreciated that any other fluid known to those skilled in the art may also be used. The pump 86 is in fluid communication with the sump 84 and is configured to draw a quantity of the fluid from the sump 84 and supply the quantity of the fluid to the gear set(s) 50, 60, the differential assembly 66, the output shafts 38, 40, and/or the sleeve shaft 28. In one embodiment, shown in FIGS. 3, 4, and 7, the pump 86 is disposed on, and is configured for rotation about, the primary axis A1. The pump 86 may be a sun pump 88, as shown in FIGS. 3 and 3A, such as a gerotor pump, that includes an inner ring 90 and an outer ring 92. The inner ring 90 extends about the primary axis A1 and is rotatable about the primary axis A1, relative to the case housing 18. The outer ring 92 surrounds the inner ring 90 about the primary axis A1 and is rotatable about the primary axis A1. The outer ring 92 may be in meshing engagement with at least one of the planetary carrier assemblies 55, 65, e.g., the pinion 54, such that operation of the planetary carrier assembly 55, 65 rotates the inner ring 90 and the outer ring 92 about the primary axis A1. The inner ring 90 is held off-center of the primary axis A1 by a feature on the case housing 18. The outer ring 92 is held on-center of the primary axis A1 by another feature on the case housing 18. Oil enters a suction side of the sun pump 88 at a bottom and is pressurized as the two rings 90, 92 of the pump rotate together (in unison). At a top of the sun pump 88, oil reaches its maximum pressure and is discharged to lube at least one of the gear set(s) 50, 60, differential assembly 66, the output shaft(s) 38, 40, and/or the sleeve shaft 28. More specifically, the outer ring 92 is in meshing engagement with each of the inner pinions 56. Although only two inner pinions 56 are shown in FIG. 3, it should be appreciated that more inner pinions 56 typically surround the outer ring 92, such as three or four inner pinions 56. Therefore, as the inner pinion 56 rotates about the respective secondary axis A2, the pinions 56 rotate the outer ring 92 about the primary axis A1. Referring to FIGS. 4 and 7, the pump 86 may be an input-driven pump 88A. The input-driven pump 88A includes the inner ring 90 and the outer ring 92. The inner ring 90 is in splined engagement with the sleeve shaft 28. Rotation of the sleeve shaft 28 rotates the inner ring 90 to draw the fluid from the sump 84 to lubricate the gear set(s) 50, 60, the differential assembly 66, the outer shaft(s) 38, 40, and/or the sleeve shaft 28.

Figure 5:
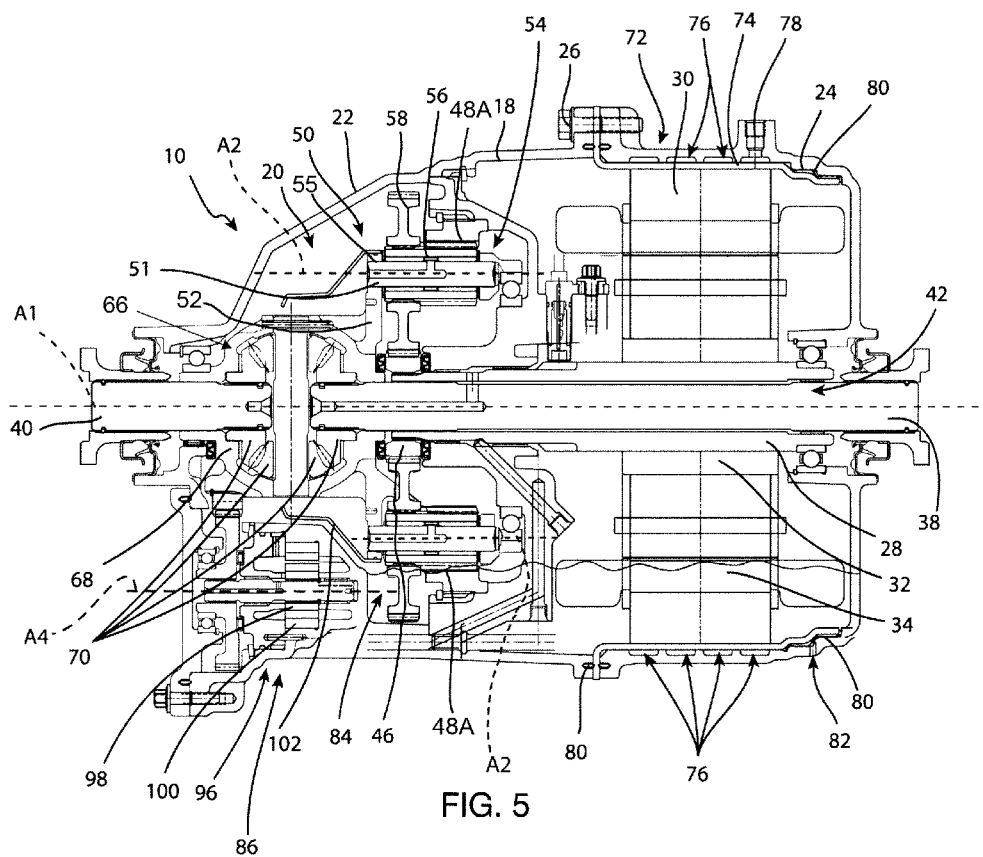
FIG. 5 is a schematic cross sectional side view of another embodiment of the EDU of FIG. 1 having an off-axis pump for providing lubrication.
Figure 6:
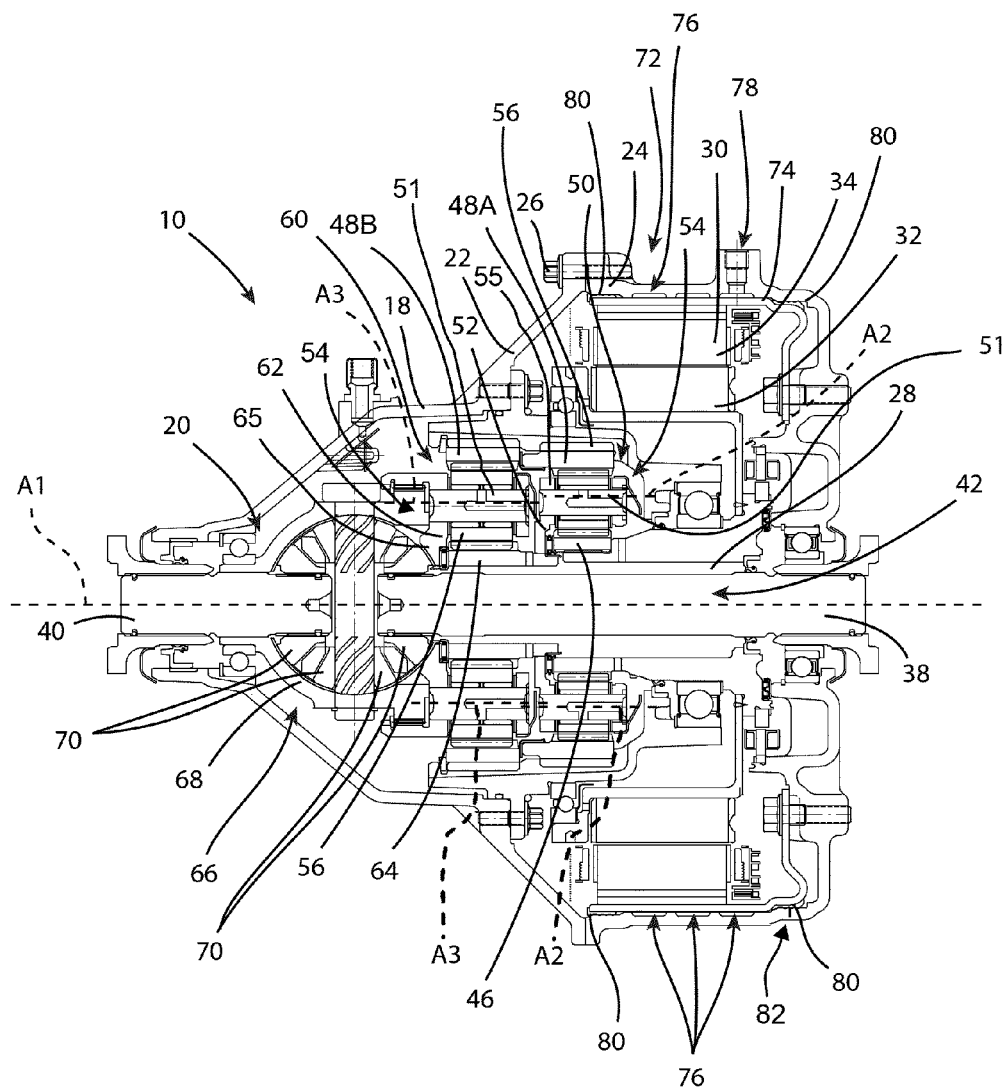
FIG. 6 is a schematic cross sectional side view of another embodiment of the EDU of FIG. 1.
Figure 8:
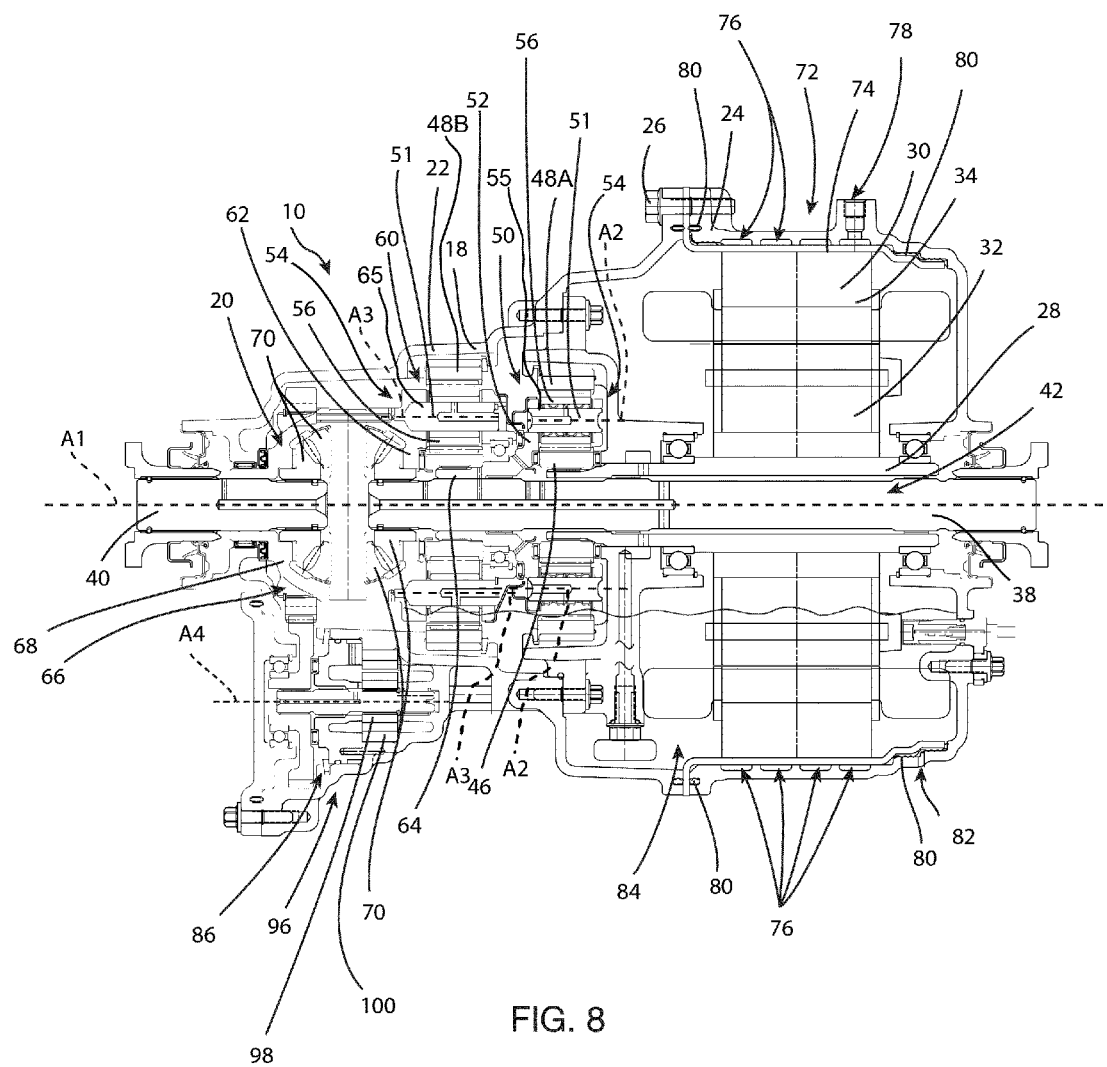
FIG. 8 is a schematic cross sectional side view of another embodiment of the EDU of FIG. 1 having an off-axis pump for providing lubrication.
Figure 9:
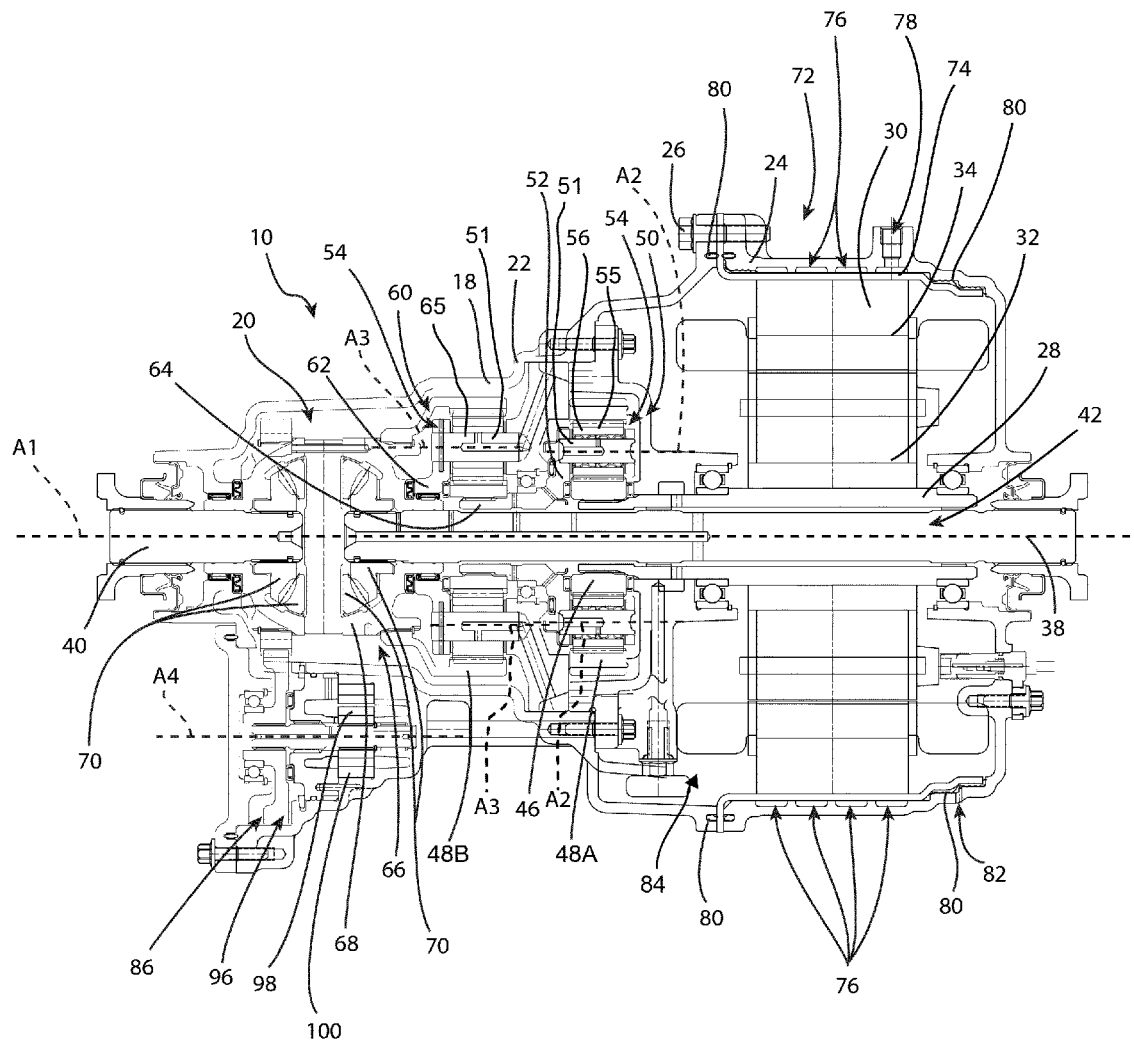
FIG. 9 is a schematic cross sectional side view of another embodiment of the EDU of FIG. 1 having an off-axis pump for providing lubrication.

In another embodiment, shown in FIGS. 5, 8, and 9, the pump 86 is disposed on a lube axis A4, in radially spaced and generally parallel relationship to the primary axis A1. In this embodiment, the pump 86 is configured to draw a quantity of the fluid from the sump 84 and supply the quantity of the fluid to the gear set(s) 50, 60. The pump 86 may be an off axis pump or a positive displacement pumping unit 96, such as a gerotor pump. This type of pump 86 includes an inner rotor 98 and an outer rotor 100 extending about the lube axis A4. The inner rotor 98 has a plurality of teeth (not shown), and the outer rotor 100 has one more tooth (not shown) than the inner rotor 98. The inner rotor 98 is located off-center and both rotors rotate. During part of the assembly's rotation cycle, an area between the inner rotor 98 and outer rotor 100 increases, creating a vacuum therebetween. This vacuum creates suction, and hence, this part of the cycle is where intake is located. Then, the area between the rotors decreases, causing compression. During this compression period, fluids may be pumped, or compressed. However, it should be appreciated that the pump 86 is not limited to being a positive displacement pumping unit 96, as any other pump 86 known to those skilled in the art may also be used.

Referring to FIGS. 2-5 lubrication may also be provided to the differential assembly 66, the gear set(s) 50, 60, the output shafts 38, 40, and/or the sleeve shaft 28 through rotation of the differential assembly 66 about the primary axis A1. In this embodiment, the differential assembly 66 may also include a slinger plate 102 that substantially surrounds the gear housing 68 of the differential assembly 66. The slinger plate 102 may be configured to rotate about the primary axis A1 in unison with the differential assembly 66. The slinger plate 102 is configured to catch or capture a lubricant from within the hollow interior 20 of the case housing 18 and direct the lubricant into at least one of the gear set(s) 50, 60, the first output shaft 38, the second output shaft 40, the sleeve shaft 28, and the differential assembly 66.

While the best modes for carrying out the invention have been described in detail, those familiar with the art to which this invention relates will recognize various alternative designs and embodiments for practicing the invention within the scope of the appended claims.

The invention claimed is:
1. An electronic drive unit (EDU) comprising:
a case housing defining a hollow interior extending along a primary axis;
a sleeve shaft disposed within said hollow interior of said case housing and extending along said primary axis;
an electric motor disposed in said hollow interior of said case housing and radially surrounding a portion of said sleeve shaft;
wherein said electric motor is operatively connected to said sleeve shaft such that said sleeve shaft rotates about said primary axis in response to operation of said electric motor;
at least one planetary gear set disposed in spaced relationship to said electric motor, along said primary axis, said at least one planetary gear set including:
a ring gear disposed in said hollow interior of said case housing and surrounding said primary axis;
a sun gear radially surrounding, and rotatably engaged with, said sleeve shaft such that said sun gear rotates about said primary axis in response to rotation of said sleeve shaft about said primary axis; and
a planetary carrier having:
at least one pinion shaft extending along a secondary axis, in spaced and parallel relationship to said primary axis;
a pinion carrier radially surrounding, and configured for rotation about, said primary axis; and
at least one pinion rotatably surrounding said at least one pinion shaft;
wherein said at least one pinion is in meshing engagement with each of said sun gear and said ring gear;
wherein said at least one pinion rotates about said respective secondary axis in response to rotation of said sun gear about said primary axis such that said planetary carrier assembly rotates about said primary axis by virtue of said meshing engagement between said at least one of said pinion and said ring gear;
wherein said at least one planetary gear set is in operative engagement with said sleeve shaft and configured for rotation about said primary axis;
at least one output shaft at least partially disposed within said hollow interior of said case housing and extending along said primary axis;

wherein said at least one output shaft is rotatably connected to said at least one planetary gear set and configured for rotation about said primary axis;

wherein said pinion carrier operatively interconnects each of said at least one pinion shaft and said at least one output shaft;

wherein said at least one planetary gear set is configured to rotate said at least one output shaft about said primary axis at a rotational velocity that is less than the rotational velocity of said sleeve shaft.

2. An EDU, as set forth in claim 1, wherein said at least one pinion includes:
- at least one inner pinion rotatable about said at least one pinion shaft, about said secondary axis; and
- at least one outer pinion radially surrounding and in engagement with a portion of said inner pinion;

wherein said at least one outer pinion is in meshing engagement with said sun gear;

wherein said at least one inner pinion is in meshing engagement with said ring gear.

3. An EDU, as set forth in claim 2, further comprising:
a sump configured to hold a volume of fluid;
at least one pump in fluid communication with said sump;
wherein said at least one pump is configured to draw a quantity of the fluid from said sump and supply the quantity of the fluid to said at least one gear set.

4. An EDU, as set forth in claim 3, wherein said at least one pump is disposed on, and configured for rotation about, said primary axis.

5. An EDU, as set forth in claim 4, wherein said at least one pump includes:
an inner ring extending about said primary axis;
an outer ring surrounding said inner ring about said primary axis;
wherein said outer ring is centered about said primary axis;
wherein said inner ring is off center from said primary axis;
wherein said inner ring and said outer ring are rotatable about said primary axis in unison;
wherein said outer ring is in meshing engagement with said at least one inner pinion such that rotation of said at least one inner pinion rotates said at least one pump to draw a quantity of the fluid from said sump into said at least one pump to pressurize and discharge the quantity of the fluid from said at least one pump to supply the quantity of the fluid to at least one of said at least one gear set, said at least one output shaft, and said sleeve shaft.

6. An EDU, as set forth in claim 3, wherein said at least one pump is disposed on a lube axis, in spaced and generally parallel relationship to said primary axis and configured to draw a quantity of the fluid from said sump and supply the quantity of the fluid to said at least one gear set.

7. An EDU, as set forth in claim 1, wherein said planetary gear set is a first planetary gear set and a second planetary gear set, axially spaced from said first planetary gear set along said primary axis;
wherein said pinion carrier of said first planetary gear set is rotatably engaged with said sun gear of said second planetary gear set.

8. An EDU, as set forth in claim 1, wherein said at least one output shaft is a first output shaft and a second output shaft, each extending along said primary axis in opposing directions;
wherein said first output shaft and said second output shaft are rotatably connected to said at least one gear set and configured for rotation about said primary axis;

wherein said at least one gear set is configured to translate rotation of said sleeve shaft into rotation of said first output shaft and said second output shaft about said primary axis.

9. An EDU, as set forth in claim 8, wherein said sleeve shaft defines a passage extending therethrough, along said primary axis, and said first output shaft extends through said passage such that said sleeve shaft surrounds said first output shaft.

10. An EDU, as set forth in claim 8, further comprising a differential assembly rotatably disposed about said primary axis between said first output shaft and said second output shaft;
wherein said differential assembly operatively interconnects each of said at least one gear set, said first output shaft, and said second output shaft such that said differential assembly and each of said first output shaft and said second output shaft rotate about said primary axis in response to said sleeve shaft rotating about said primary axis.

11. An EDU, as set forth in claim 10, wherein said differential assembly includes a gear housing and a pinion carrier extending from said gear housing;
wherein said gear housing rotatably supports each of said first output shaft and said second output shaft along said primary axis;
wherein said pinion carrier is operatively connected to said at least one gear set.

12. An EDU, as set forth in claim 11, wherein said differential assembly includes a slinger plate substantially surrounding said gear housing and configured for rotation about said primary axis with said differential assembly;
wherein said slinger plate is configured for capturing a lubricant from within said hollow interior of said case housing and directing the lubricant into at least one of said at least one gear set, said first output shaft, said second output shaft, said sleeve shaft, and said differential assembly.

13. An EDU, as set forth in claim 1, further comprising:
a motor housing extending about said primary axis and surrounding said electric motor; and
a cooling cavity defined between said motor housing and said case housing and configured such that a coolant flows through said cooling cavity to cool said motor housing.

14. An EDU, as set forth in claim 13, further comprising at least one seal disposed between said motor housing and said case housing, wherein said at least one seal is configured to prevent leakage of the coolant from said cooling cavity to said electric motor.

15. An EDU, as set forth in claim 14, wherein said case defines at least one vent opening to said seal, wherein said vent is configured to allow any of the coolant leaking past said seal to flow therethrough and out said case housing.

16. An EDU, as set forth in claim 13, wherein said case housing includes a case and a case cover;
wherein said motor housing is disposed between said electric motor and said case cover;
wherein said case cover is removably attached to said case.

17. An electronic drive unit (EDU) comprising:
a case housing defining a hollow interior extending along a primary axis and configured to hold a volume of fluid therein;
a sleeve shaft disposed within said hollow interior of said case housing and extending along said primary axis;
a planetary gear set disposed in said case housing in operative engagement with said sleeve shaft and configured for rotation about said primary axis;

wherein said planetary gear set includes;
   a ring gear disposed in said hollow interior of said case housing and surrounding said primary axis,
   a sun gear radially surrounding, and rotatably engaged with, said sleeve shaft such that said sun gear rotates about said primary axis in response to rotation of said sleeve shaft about said primary axis,
   a planetary carrier including:
      at least one pinion shaft extending along a secondary axis, in spaced and parallel relationship to said primary axis,
      a pinion carrier radially surrounding, and configured for rotation about, said primary axis, wherein said pinion carrier operatively interconnects each of said at least one pinion shaft and said at least one output shaft,
      at least one inner pinion rotatable about said at least one pinion shaft, about said secondary axis;
      at least one outer pinion radially surrounding and in operative engagement with a portion of said inner pinion;
   wherein said at least one outer pinion is in meshing engagement with said sun gear;
   wherein said at least one inner pinion is in meshing engagement with said ring gear;
   wherein said at least one pinion is in meshing engagement with each of said sun gear and said ring gear,
   wherein said at least one pinion rotates about said respective secondary axis in response to rotation of said sun gear about said primary axis such that said planetary carrier assembly rotates about said primary axis by virtue of said meshing engagement between said at least one of said pinion and said ring gear;
at least one pump including;
   an inner ring extending about said primary axis;
   an outer ring surrounding said inner ring about said primary;
   wherein said outer ring is centered about said primary axis;
   wherein said inner ring is off center from said primary axis;
   wherein said inner ring and said outer ring are rotatable about said primary axis in unison;
wherein said outer ring is in meshing engagement with said at least one inner pinion such that rotation of said at least one inner pinion rotates said at least one pump to draw a quantity of the fluid from said sump into said at least one pump to pressurize and discharge the quantity of the fluid from said at least one pump to supply the quantity of the fluid to at least one of said at least one gear set, said at least one output shaft, and said sleeve shaft.

18. An electronic drive unit (EDU) comprising:
a case housing defining a hollow interior extending along a primary axis;
a sleeve shaft disposed within said hollow interior of said case housing and extending along said primary axis;
an electric motor disposed in said hollow interior of said case housing and radially surrounding a portion of said sleeve shaft;
wherein said electric motor is operatively connected to said sleeve shaft such that said sleeve shaft rotates about said primary axis in response to operation of said electric motor;
at least one gear set disposed in spaced relationship to said electric motor, along said primary axis;
wherein said at least one gear set is in operative engagement with said sleeve shaft and configured for rotation about said primary axis;
a first output shaft and a second output shaft, at least partially disposed within said hollow interior of said case housing and extending along said primary axis;
wherein each of said first and second output shafts extend along said primary axis in opposing directions;
wherein said at least one output shaft is rotatably connected to said at least one gear set and configured for rotation about said primary axis;
wherein said at least one gear set is configured to rotate said at least one output shaft about said primary axis at a rotational velocity that is less than the rotational velocity of said sleeve shaft;
wherein said at least one gear set is configured to translate rotation of said sleeve shaft into rotation of said first output shaft and said second output shaft about said primary axis;
a differential assembly rotatably disposed about said primary axis between said first output shaft and said second output shaft;
wherein said differential assembly operatively interconnects each of said at least one gear set, said first output shaft, and said second output shaft such that said differential assembly and each of said first output shaft and said second output shaft rotate about said primary axis in response to said sleeve shaft rotating about said primary axis;
wherein said differential assembly includes a gear housing and a pinion carrier extending from said gear housing;
wherein said gear housing rotatably supports each of said first output shaft and said second output shaft along said primary axis;
wherein said pinion carrier is operatively connected to said at least one gear set;
wherein said differential assembly includes a slinger plate substantially surrounding said gear housing and configured for rotation about said primary axis with said differential assembly; and
wherein said slinger plate is configured for capturing a lubricant from within said hollow interior of said case housing and directing the lubricant into at least one of said at least one gear set, said first output shaft, said second output shaft, said sleeve shaft, and said differential assembly.

* * * * *